United States Patent
Medina et al.

(10) Patent No.: US 12,324,004 B2
(45) Date of Patent: Jun. 3, 2025

(54) EFFICIENT SIGNALING OF SIDELINK RADIO RESOURCES

(71) Applicant: Nokia Technologies Oy, Espoo (FI)

(72) Inventors: Daniel Medina, Munich (DE); Lianghai Ji, Aalborg (DK); Berthold Panzner, Munich (DE); Nuno Manuel Kiilerich Pratas, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/264,382

(22) PCT Filed: Feb. 16, 2022

(86) PCT No.: PCT/EP2022/053768
§ 371 (c)(1),
(2) Date: Aug. 4, 2023

(87) PCT Pub. No.: WO2022/184437
PCT Pub. Date: Sep. 9, 2022

(65) Prior Publication Data
US 2024/0113821 A1     Apr. 4, 2024

(30) Foreign Application Priority Data
Mar. 1, 2021     (FI) ..................................... 20215219

(51) Int. Cl.
*H04W 72/40* (2023.01)
*H04W 72/02* (2009.01)
(Continued)

(52) U.S. Cl.
CPC ........... *H04W 72/40* (2023.01); *H04W 72/02* (2013.01); *H04W 72/0446* (2013.01); *H04W 72/0453* (2013.01); *H04W 72/25* (2023.01)

(58) Field of Classification Search
CPC ............. H04W 72/02; H04W 72/0446; H04W 72/0453; H04W 72/25; H04W 72/40
See application file for complete search history.

(56) References Cited

U.S. PATENT DOCUMENTS

2020/0029318 A1   1/2020   Guo
2021/0050950 A1   2/2021   Zhou et al.
(Continued)

FOREIGN PATENT DOCUMENTS

JP   2013236168 A   11/2013
JP   2015111805 A    6/2015
(Continued)

OTHER PUBLICATIONS

"3rd Generation Partnership Project; Technical Specification Group Radio Access Network; NR; Multiplexing and channel coding (Release 16)", 3GPP TS 38.212, V16.3.0, Sep. 2020, pp. 1-152.
(Continued)

*Primary Examiner* — Kevin C. Harper
(74) *Attorney, Agent, or Firm* — McCarter & English LLP

(57) ABSTRACT

Disclosed is a method for efficient signaling of sidelink radio resources. A first terminal device selects a subset of radio resources from a set of candidate radio resources. The first terminal device determines a set of resource indices for the subset of radio resources based at least partly on a predefined enumeration order of the set of candidate radio resources in time and frequency. The first terminal device determines a first resource indication value indicating at least the set of resource indices. The first terminal device transmits the first resource indication value to one or more second terminal devices.

12 Claims, 8 Drawing Sheets

(51) Int. Cl.
*H04W 72/0446* (2023.01)
*H04W 72/0453* (2023.01)
*H04W 72/25* (2023.01)

(56) References Cited

U.S. PATENT DOCUMENTS

| | | | |
|---|---|---|---|
| 2021/0084660 A1* | 3/2021 | Taherzadeh Boroujeni | ............... H04W 72/02 |
| 2022/0322359 A1* | 10/2022 | Ye | ............... H04W 72/563 |
| 2023/0309125 A1* | 9/2023 | Li | ............... H04W 72/1263 |

FOREIGN PATENT DOCUMENTS

| WO | 2020/096280 A1 | 5/2020 |
|---|---|---|
| WO | 2021/022551 A1 | 2/2021 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

"Discussion of feasibility and benefits for mode 2 enhancements", 3GPP TSG RAN WG1#103-e, R1-2007623, Agenda: 8.11.2.2, Nokia, Oct. 26-Nov. 13, 2020, 8 pages.

"Combinatorial number system", Wikipedia, Retrieved on Aug. 12, 2023, Webpage available at : https://en.wikipedia.org/wiki/Combinatorial_number_system.

Knuth, "Generating All Combinations and Partitions", The Art of Computer Programming, vol. 4, Fascicle 3, 2005, pp. 5-6.

Pascal, "Sopra una formula numerica", Giornale di Matematiche, 25, 1887, pp. 45-49.

Office action received for corresponding Finnish Patent Application No. 20215219, dated Aug. 17, 2021, 9 pages.

Office action received for corresponding Finnish Patent Application No. 20215219, dated Feb. 2, 2022, 6 pages.

International Search Report and Written Opinion received for corresponding Patent Cooperation Treaty Application No. PCT/EP2022/053768, dated Jun. 10, 2022, 13 pages.

"Sidelink physical structure for NR V2X communication", 3GPP TSG RAN WG1 Meeting #99, R1-1912203, Agenda: 7.2.4.1, Intel Corporation, Nov. 18-22, 2019, pp. 1-34.

"3rd Generation Partnership Project; Technical Specification Group Radio Access Network; NR; Physical layer procedures for data (Release 16)", 3GPP TS 38.214, V16.4.0, Dec. 2020, pp. 1-169.

Office action received for corresponding European Patent Application No. 22710501.2, dated Sep. 20, 2024, 7 pages.

Office action received for corresponding Japanese Patent Application No. 2023-553193, dated Oct. 1, 2024, 5 pages of office action and 7 pages of office action translation available.

"Discussion on feasibility and benefits for mode 2 enhancements", 3GPP TSG RAN WG1 Meeting #104-e, R1-2101786, Agenda: 8.11.1.2, LG Electronics, Jan. 25-Feb. 5, 2021, 5 pages.

"Summary#4 for AI 7.2.4.2.2 Mode-2 Resource Allocation", 3GPP TSG RAN WG1 Meeting #99, R1-1913569, Agenda: 7.2.4.2.2, Intel Corporation, Nov. 18-22, 2019, 4 pages.

"Sidelink physical structure for NR V2X communication", 3GPP TSG RAN WG1 Meeting #99, R1-1913255, Agenda: 7.2.4.1, Intel Corporation, Nov. 18-22, 2019, 7 pages.

"Outcome of email thread [100e-NR-5G_V2X_NRSL-RA_Mode2-03]", 3GPP TSG RAN WG1 Meeting #100-E, R1-2001346, Agenda: 7.2.4.2.2, Intel Corporation, Feb. 24-Mar. 6, 2020, 12 pages.

Office action received for corresponding Indian Patent Application No. 202347057583, dated Oct. 10, 2024, 7 pages.

* cited by examiner

| 30 | 31 | 32 | 33 | 34 | 35 | 36 | 37 | 38 | 39 |
|----|----|----|----|----|----|----|----|----|----|
| 20 | 21 | 22 | 23 | 24 | 25 | 26 | 27 | 28 | 29 |
| 10 | 11 | 12 | 13 | 14 | 15 | 16 | 17 | 18 | 19 |
| 0  | 1  | 2  | 3  | 4  | 5  | 6  | 7  | 8  | 9  |

Table 1

| 3 | 7 | 11 | 15 | 19 | 23 | 27 | 31 | 35 | 39 |
|---|---|----|----|----|----|----|----|----|----|
| 2 | 6 | 10 | 14 | 18 | 22 | 26 | 30 | 34 | 38 |
| 1 | 5 | 9  | 13 | 17 | 21 | 25 | 29 | 33 | 37 |
| 0 | 4 | 8  | 12 | 16 | 20 | 24 | 28 | 32 | 36 |

Table 2

FIG. 11

EFFICIENT SIGNALING OF SIDELINK RADIO RESOURCES

RELATED APPLICATION

This application claims priority to PCT Application No. PCT/EP2022/053768, filed on Feb. 16, 2022, which claims priority from FI application No. 20215219, filed on Mar. 1, 2021, each of which is incorporated herein by reference in its entirety.

FIELD

The following exemplary embodiments relate to wireless communication.

BACKGROUND

As resources are limited, it is desirable to optimize the usage of resources. In sidelink communication, i.e. device-to-device communication, a terminal device may be utilized to enable better usage of resources for communicating with another terminal device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: select a subset of radio resources from a set of candidate radio resources; determine a set of resource indices for the subset of radio resources based at least partly on a pre-defined enumeration order of the set of candidate radio resources in time and frequency; determine a first resource indication value indicating at least the set of resource indices; and transmit the first resource indication value to one or more second terminal devices, wherein the apparatus is comprised in a first terminal device.

According to another aspect, there is provided an apparatus comprising means for: selecting a subset of radio resources from a set of candidate radio resources; determining a set of resource indices for the subset of radio resources based at least partly on a pre-defined enumeration order of the set of candidate radio resources in time and frequency; determining a first resource indication value indicating at least the set of resource indices; and transmitting the first resource indication value to one or more second terminal devices, wherein the apparatus is comprised in a first terminal device.

According to another aspect, there is provided a method comprising: selecting, by a first terminal device, a subset of radio resources from a set of candidate radio resources; determining, by the first terminal device, a set of resource indices for the subset of radio resources based at least partly on a pre-defined enumeration order of the set of candidate radio resources in time and frequency; determining, by the first terminal device, a first resource indication value indicating at least the set of resource indices; and transmitting, by the first terminal device, the first resource indication value to one or more second terminal devices.

According to another aspect, there is provided a computer program comprising instructions for causing an apparatus to perform at least the following: select a subset of radio resources from a set of candidate radio resources; determine a set of resource indices for the subset of radio resources based at least partly on a pre-defined enumeration order of the set of candidate radio resources in time and frequency; determine a first resource indication value indicating at least the set of resource indices; and transmit the first resource indication value to one or more second terminal devices, wherein the apparatus is comprised in a first terminal device.

According to another aspect, there is provided a computer readable medium comprising program instructions for causing an apparatus to perform at least the following: select a subset of radio resources from a set of candidate radio resources; determine a set of resource indices for the subset of radio resources based at least partly on a pre-defined enumeration order of the set of candidate radio resources in time and frequency; determine a first resource indication value indicating at least the set of resource indices; and transmit the first resource indication value to one or more second terminal devices, wherein the apparatus is comprised in a first terminal device.

According to another aspect, there is provided a non-transitory computer readable medium comprising program instructions for causing an apparatus to perform at least the following: select a subset of radio resources from a set of candidate radio resources; determine a set of resource indices for the subset of radio resources based at least partly on a pre-defined enumeration order of the set of candidate radio resources in time and frequency; determine a first resource indication value indicating at least the set of resource indices; and transmit the first resource indication value to one or more second terminal devices, wherein the apparatus is comprised in a first terminal device.

According to an aspect, there is provided an apparatus comprising at least one processor, and at least one memory including computer program code, wherein the at least one memory and the computer program code are configured, with the at least one processor, to cause the apparatus to: receive a resource indication value from a first terminal device, wherein the resource indication value indicates at least a set of resource indices associated with a subset of radio resources, and wherein a resource index in the set of resource indices indicates a location of a radio resource comprised in the subset of radio resources in time and frequency; determine the subset of radio resources from a set of candidate radio resources based at least partly on the resource indication value; and select a radio resource from the subset of radio resources for a sidelink transmission, wherein the apparatus is comprised in a second terminal device.

According to another aspect, there is provided an apparatus comprising means for: receiving a resource indication value from a first terminal device, wherein the resource indication value indicates at least a set of resource indices associated with a subset of radio resources, and wherein a resource index in the set of resource indices indicates a location of a radio resource comprised in the subset of radio resources in time and frequency; determining the subset of radio resources from a set of candidate radio resources based at least partly on the resource indication value; and selecting a radio resource from the subset of radio resources for a sidelink transmission, wherein the apparatus is comprised in a second terminal device.

According to another aspect, there is provided a method comprising: receiving, by a second terminal device, a resource indication value from a first terminal device, wherein the resource indication value indicates at least a set of resource indices associated with a subset of resources; determining, by the second terminal device, the subset of resources from a set of candidate resources based at least partly on the resource indication value; and selecting, by the second terminal device, a resource from the subset of resources for a sidelink transmission.

According to another aspect, there is provided a computer program comprising instructions for causing an apparatus to perform at least the following: receive a resource indication value from a first terminal device, wherein the resource indication value indicates at least a set of resource indices associated with a subset of radio resources, and wherein a resource index in the set of resource indices indicates a location of a radio resource comprised in the subset of radio resources in time and frequency; determine the subset of radio resources from a set of candidate radio resources based at least partly on the resource indication value; and select a radio resource from the subset of radio resources for a sidelink transmission, wherein the apparatus is comprised in a second terminal device.

According to another aspect, there is provided a computer readable medium comprising program instructions for causing an apparatus to perform at least the following: receive a resource indication value from a first terminal device, wherein the resource indication value indicates at least a set of resource indices associated with a subset of radio resources, and wherein a resource index in the set of resource indices indicates a location of a radio resource comprised in the subset of radio resources in time and frequency; determine the subset of radio resources from a set of candidate radio resources based at least partly on the resource indication value; and select a radio resource from the subset of radio resources for a sidelink transmission, wherein the apparatus is comprised in a second terminal device.

According to another aspect, there is provided a non-transitory computer readable medium comprising program instructions for causing an apparatus to perform at least the following: receive a resource indication value from a first terminal device, wherein the resource indication value indicates at least a set of resource indices associated with a subset of radio resources, and wherein a resource index in the set of resource indices indicates a location of a radio resource comprised in the subset of radio resources in time and frequency; determine the subset of radio resources from a set of candidate radio resources based at least partly on the resource indication value; and select a radio resource from the subset of radio resources for a sidelink transmission, wherein the apparatus is comprised in a second terminal device.

According to another aspect, there is provided a system comprising at least a first terminal device and a second terminal device. The first terminal device is configured to: select a subset of radio resources from a set of candidate radio resources; determine a set of resource indices for the subset of radio resources based at least partly on a pre-defined enumeration order of the set of candidate radio resources in time and frequency; determine a resource indication value indicating at least the set of resource indices; and transmit the resource indication value to the second terminal device. The second terminal device is configured to: receive the resource indication value from the first terminal device; determine the subset of radio resources from the set of candidate radio resources based at least partly on the resource indication value; and select a radio resource from the subset of radio resources for a sidelink transmission.

According to another aspect, there is provided a system comprising comprising at least a first terminal device and a second terminal device. The first terminal device comprises means for: selecting a subset of radio resources from a set of candidate radio resources; determining a set of resource indices for the subset of radio resources based at least partly on a pre-defined enumeration order of the set of candidate radio resources in time and frequency; determining a resource indication value indicating at least the set of resource indices; and transmitting the resource indication value to the second terminal device. The second terminal device comprises means for: receiving the resource indication value from the first terminal device; determining the subset of radio resources from the set of candidate radio resources based at least partly on the resource indication value; and selecting a radio resource from the subset of radio resources for a sidelink transmission.

BRIEF DESCRIPTION OF THE DRAWINGS

In the following, various exemplary embodiments will be described in greater detail with reference to the accompanying drawings, in which

FIG. 11 illustrates enumerated candidate radio resources in accordance with example embodiments of the invention.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. For example, some exemplary embodiments may be applied to sidelink communication over the PCS air interface and/or uplink/downlink over the Uu interface. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
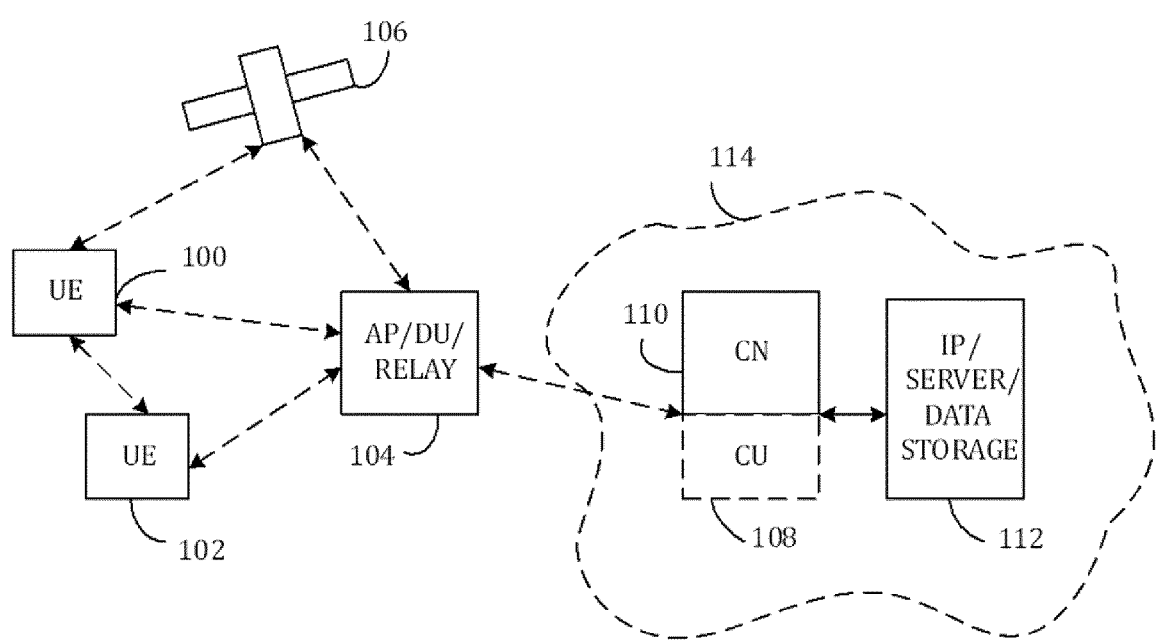
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The NodeB may also be referred to as a base station, an access point or any other type of interfacing device including a relay station capable of operating in a wireless environment. The (e/g)NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which radio resources on the air interface may be allocated and assigned, and thus any feature described herein with a user device may be implemented with a corresponding apparatus, such as a relay node. An example of such a relay node may be a layer 3 relay (self-backhauling relay) towards the base station.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G may enable using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It may also be possible that node operations will be distributed among a plurality of servers, nodes or hosts. Application of cloudRAN architecture may enable RAN real time functions being carried out at the RAN side (in a distributed unit, DU 104) and non-real time functions being carried out in a centralized manner (in a central unit, CU 108).

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB. Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)Node Bs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

Sidelink communication enables direct communication between UEs, as well as relaying traffic between a network and a UE or between two UEs via a relay UE. NR sidelink may support for example advanced vehicle-to-everything (V2X) communication services, such as sensor sharing, as well as proximity services (ProSe) communication. NR sidelink transmissions may occur for example in the physical sidelink shared channel (PSSCH). In NR sidelink mode 1, radio resources for PSSCH transmissions may be scheduled by a base station, such as a gNB. In NR sidelink mode 2, radio resources for PSSCH transmissions may be selected autonomously by the UEs.

Figure 2:
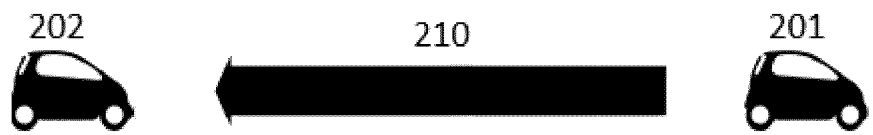
FIG. 2 illustrates sidelink radio resource allocation coordination between terminal devices.

FIG. 2 illustrates inter-UE coordination for NR sidelink mode 2 resource allocation. A set of radio resources is determined by a first UE 201. The set of radio resources is transmitted 210 to a second UE 202. The second UE 202 then takes this set of radio resources into account in the resource selection for its own PSSCH transmission.

Such inter-UE coordination may be used, for example, when a first UE acts as a group leader by coordinating radio resources used by other UEs in the group, such as in a platoon. Another example use case may be receiver-assisted resource selection, for example in unicast sidelink communication, wherein a receiver UE indicates its preferred or non-preferred radio resources to a transmitter UE. This may be used, for example, as a way to address the hidden terminal problem, wherein the receiver UE is exposed to interference sources not detectable by the transmitter UE.

Figure 3:
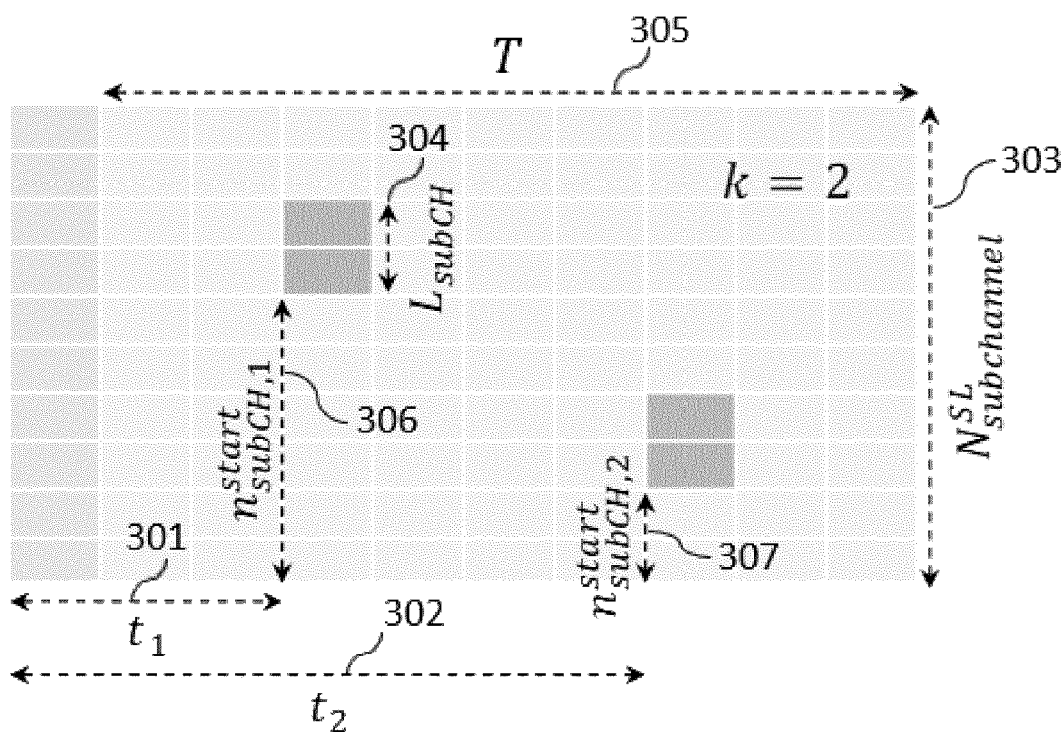
FIG. 3 illustrates an example showing two reserved radio resources.

In Rel-16 NR sidelink, a 1st stage sidelink control information (SCI) may comprise resource allocation information for reserving up to k=2 radio resources within a time window comprising T=31 logical slots of a resource pool, starting from the logical slot next to that in which the SCI is transmitted, as illustrated in FIG. 3. FIG. 3 illustrates an example showing two reserved radio resources indicated by an SCI format 1-A.

The resource allocation information carried by an SCI format 1-A comprises the following two fields: a time resource assignment in the form of a time resource indication value (TRIV), and a frequency resource assignment in the form of a frequency resource indication value (FRIV).

The TRIV field indicates the logical slot offsets of the reserved resources with respect to the slot in which the SCI is transmitted. In the case of two reserved resources (k=2), the two offsets $t_1$ and $t_2$ (with $1 \leq t_1 < t_2 \leq 31$) are encoded by the TRIV field as follows:

$$TRIV = \begin{cases} 30(t_2 - t_1 - 1) + t_1 + 31 & \text{if } (t_2 - t_1 - 1) \leq 15 \\ 30(31 - t_2 + t_1) + 62 - t_1 & \text{otherwise} \end{cases}$$

In FIG. 3, the offset $t_1$ is illustrated by the interval 301, and the offset $t_2$ is illustrated by the interval 302. As there are $$\binom{31}{2}$$

possible ways of choosing $(t_1, t_2)$, the TRIV field in this case incurs an overhead of $$\left\lceil \log_2 \binom{31}{2} \right\rceil = 9 \text{ bits}.$$

It should be noted that the two reserved resources are not allowed to be in the same slot, since $t_1 < t_2$.

The FRIV field indicates the starting subchannel indices of the reserved resources within the resource pool, comprising a total of $N_{subchannel}^{SL}$ channels illustrated in FIG. 3 by the interval 303, as well as the resource size $L_{subCH}$ illustrated in FIG. 3 by the interval 304, i.e., the length of contiguous subchannels. The interval 305 illustrates the number of logical slots T=31. In the case of two reserved resources (k=2), the two starting subchannel indices $n_{subCH,1}^{start}$ and $n_{subCH,2}^{start}$ are encoded, along with the resource size $L_{subCH}$, by the FRIV field as follows:

$$FRIV = n_{subCH,1}^{start} + n_{subCH,2}^{start}(N_{subchannel}^{SL}+1-L_{subCH}) + \sum_{i=1}^{L_{subCH}-1}(N_{subchannel}^{SL}+1-i)^2$$

In FIG. 3, $n_{subCH,1}^{start}$ is illustrated by the interval 306, and $n_{subCH,2}^{start}$ is illustrated by the interval 307. As there are $\sum_{m=1}^{N_{subchannel}^{SL}} m^2$ possible FRIV values, the FRIV field in this case incurs an overhead of $$\left\lceil \log_2 \left( \sum_{m=1}^{N_{subchannel}^{SL}} m^2 \right) \right\rceil = \left\lceil \log_2 \left( \frac{N_{subchannel}^{SL}(N_{subchannel}^{SL}+1)(2N_{subchannel}^{SL}+1)}{6} \right) \right\rceil \text{ bits}.$$

The TRIV and FRIV formulas above are applicable for k=2. The FRIV formula may be generalized for an arbitrary number of indicated radio resources k as follows:

$$FRIV = \sum_{j=1}^{k} n_{subCH,j}^{start}(N_{subchannel}^{SL}+1-L_{subCH})^{j-1} + \sum_{i=1}^{L_{subCH}-1}(N_{subchannel}^{SL}+1-i)^k$$

The FRIV field in this case would incur an overhead of $$\left\lceil \log_2 \left( \sum_{m=1}^{N_{subchannel}^{SL}} m^k \right) \right\rceil \text{ bits}.$$

However, the TRIV formula may not allow a generalization for k>2. As mentioned previously, a further limitation of the TRIV formula is that the indicated resources cannot be in the same slot, since $t_1 < t_2$. In addition, a limitation of the FRIV formula is that all of the radio resources are assumed to have the same resource size $L_{subCH}$. Therefore, the TRIV & FRIV technique used in the SCI format 1-A cannot be applied for signaling an arbitrary set of radio resources.

Some exemplary embodiments may be used to efficiently encode any number of radio resources determined by a first UE in order to minimize control signaling overhead for inter-UE coordination for example in NR sidelink mode 2 resource allocation. Some exemplary embodiments may comprise a method for signaling a set of radio resources from a first UE to one or more second UEs with minimal overhead.

Some exemplary embodiments may utilize the combinatorial number system of degree k. In mathematics, the combinatorial number system of degree k is a correspondence between natural numbers (including 0) and k-combinations, i.e., subsets of k distinct elements, thereof. A number N, where $$0 \leq N < \binom{n}{k},$$

corresponds to a k-combination of the set {0, 1, . . . , n−1}. The number N corresponding to a specific k-combination $\{c_1, c_2, \ldots, c_k\}$, with $0 \leq c_1 < c_2 < \ldots < c_k$, is given by:

$$N = \sum_{j=1}^{k} \binom{c_j}{j} = \binom{c_1}{1} + \binom{c_2}{2} + \ldots + \binom{c_k}{k}$$

This operation is known as "ranking" in computational mathematics. The inverse operation, known as "unranking", i.e., finding the k-combination $\{c_1, c_2, \ldots, c_k\}$ corresponding to a number N, may be performed by a greedy algorithm as follows. First, $c_k$ is determined as the largest number fulfilling $$\binom{c_k}{k} \leq N.$$

Then, $c_{k-1}$ is determined as the largest number fulfilling $$\binom{c_{k-1}}{k-1} \leq N - \binom{c_k}{k},$$

and so forth. The combinatorial number system may allow rapid computation of the k-combination that is at a given position in the lexicographic ordering, without having to explicitly list the k-combinations preceding it.

Figure 4:
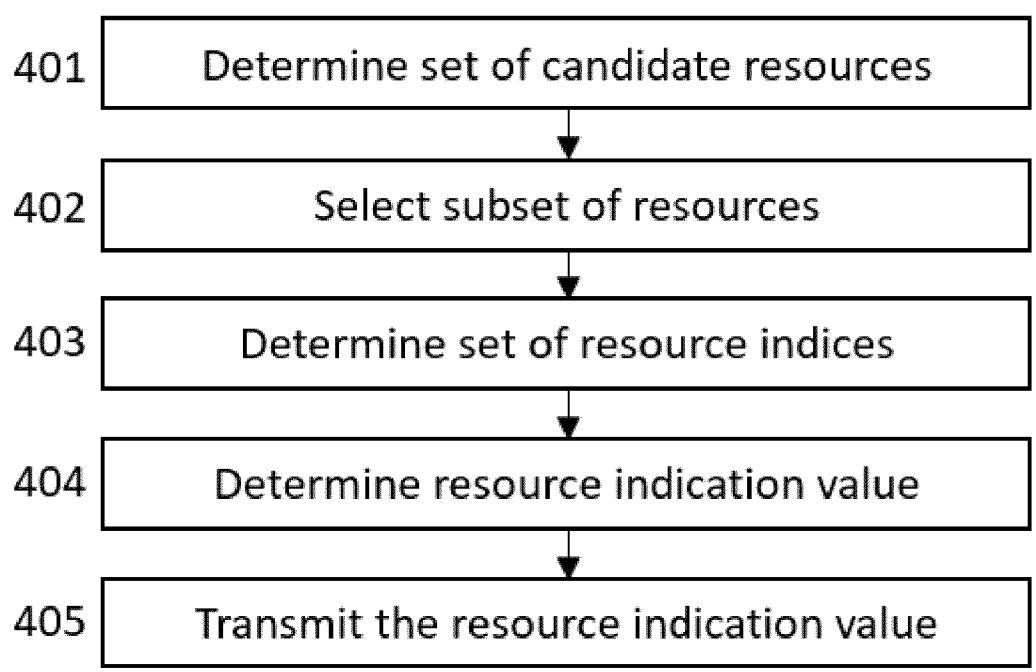
FIG. 4 illustrates a flow chart according to an exemplary embodiment.

FIG. 4 illustrates a flowchart according to an exemplary embodiment. Referring to FIG. 4, a first UE determines 401 a set of candidate radio resources for a PSSCH transmission by one or more second UEs. The first UE selects 402 a subset of radio resources from the set of candidate radio resources. The first UE determines 403 a set of resource indices for the subset of selected radio resources based at least partly on a pre-defined enumeration order of the set of candidate radio resources in the time domain and the frequency domain. Based on the determined resource indices, the first UE determines 404 a resource indication value, for example, a combinatorial resource indication value (CRIV), indicating the subset of selected radio resources. A CRIV comprises both time-domain and frequency-domain information. The first UE transmits 405 the determined resource indication value to the one or more second UEs.

The determining 401 of the set of candidate radio resources may be triggered, for example, by the first UE receiving a coordination request (CR), scheduling request (SR) or buffer status report (BSR) from the one or more second UEs. A candidate radio resource for transmission of PSSCH may be defined by a time-domain resource, i.e., one or more slots, and/or a frequency-domain resource, i.e., one or more subchannels. The first UE may determine a resource size $L_{subCH}$, i.e., length of contiguous subchannels in the frequency domain, for example based on the received BSR, channel conditions, etc. For example, a high buffer level, or bad channel conditions, may lead the first UE to consider a large radio resource, whereas a low buffer level, or good channel conditions, may lead the first UE to consider a small radio resource. The set of candidate radio resources may thus be constrained by the determined resource size.

The set of candidate radio resources may be further constrained by a configured sidelink radio resource pool for transmission of PSSCH by the second UE. In other words, the candidate radio resources may be limited to the resources within the resource pool. The first UE may be assumed to be aware of the resource pool of the second UE, for example if the first UE is also configured with the same resource pool, or if the first UE is in control of the resource pool of the second UE. Alternatively, the second UE(s) may inform the first UE of its resource pool, for example when requesting radio resources from the first UE.

Similarly, the set of candidate radio resources may be constrained by a time interval, i.e., a resource selection window (RSW), imposed by the requirement to fulfill a pre-defined packet delay budget. In other words, the candidate radio resources may be limited to the resources within the time interval. Such a RSW may be determined by the first UE based on a time, for example a slot, at which a CR, SR or BSR is received from the second UE, and/or a packet delay budget that is pre-defined or indicated by the second UE. The RSW may also be pre-defined or configured.

For example, in case the first UE has determined a resource size $L_{subCH}$ and a RSW comprising T logical slots of a sidelink radio resource pool configured for PSSCH transmission by the second UE, the set of candidate radio resources may comprise a total of:

$$n = T \times (N_{subchannel}^{SL} - L_{subCH} + 1)$$

single-slot resources comprising $L_{subCH}$ contiguous subchannels within the configured sidelink radio resource pool, where $N_{subchannel}^{SL}$ is the number of subchannels of the configured sidelink radio resource pool.

For selecting 402 the subset of k radio resources from the set of n candidate radio resources, the number k of selected radio resources in the subset may be configured by the network, i.e., a base station, for example by using a radio resource control (RRC) message, or the number k may be derived by the first UE. For example, the number k may be a pre-defined fraction, for example 10%, of the number of candidate radio resources.

The first UE may select the subset of radio resources, for example, based on sensing measurements, such as reference signal received power (RSRP) and/or received signal strength indicator (RSSI), performed by the first UE. For example, the subset of radio resources may comprise preferred and/or non-preferred radio resources from the perspective of the first UE as an intended receiver of a subsequent PSSCH transmission by the one or more second UEs.

The k selected radio resources may be of the same size, for example $L_{subCH}$ contiguous subchannels in a single slot, as shown in FIG. 3. Alternatively, the selected radio resources may have different resource sizes. For example, the jth selected radio resource, $1 \leq j \leq k$, may comprise $L_{subCH,j}$ contiguous subchannels in a single slot.

For determining 403 the resource index $r_j$ for the jth selected radio resource ($1 \leq j \leq k$), the resource index may be determined such that $0 \leq r_1 < r_2 < \ldots < r_k < n$. The first UE may determine the resource index $r_j$ based on an enumeration of the candidate radio resources in a pre-defined order. The enumeration order may be based on the location of the candidate radio resources in the time domain and in the frequency domain.

For example, the resource index $r_j$ for the jth selected radio resource ($1 \leq j \leq k$) may be determined as follows:

$$r_j = t_j + n_{subCH,j}^{start} T$$

where $0 \leq t_j < T$ is a logical slot offset of a logical slot in which the jth selected radio resource occurs with respect to the first logical slot of the RSW, and $0 \leq n_{subCH,j}^{start} < N_{subchannel}^{SL} - L_{subCH} + 1$ is a starting sub channel index of the jth selected radio resource within the configured sidelink radio resource pool. In this case, the candidate radio resources may be assumed to be enumerated by considering the time domain first, as shown in Table 1 of FIG. 11. Table 1 illustrates an example of enumerating candidate radio resources with T=10 logical slots, $N_{subchannel}^{SL}=4$ subchannels and $L_{subCH}=1$ subchannel. In Table 1, the rows indicate frequency, i.e., subchannels, and the columns indicate time, i.e., logical slots. The bolded cells indicate the determined resource indices.

Alternatively, the resource index $r_j$ for the jth selected radio resource ($1 \leq j \leq k$) may be determined as follows:

$$r_j = n_{subCH,j}^{start} + t_j (N_{subchannel}^{SL} - L_{subCH} + 1)$$

In this case, the candidate radio resources may be assumed to be enumerated by considering the frequency domain first, as shown in Table 2 of FIG. 11. Table 2 illustrates an example of enumerating candidate radio resources with T=10 logical slots, $N_{subchannel}^{SL}=4$ subchannels and $L_{subCH}=1$ subchannel. In Table 2, the rows indicate frequency, i.e., sub channels, and the columns indicate time, i.e., logical slots. The bolded cells indicate the determined resource indices.

Having determined the resource index $r_j$ for the k selected radio resources ($1 \leq j \leq k$), the first UE may determine a rank R, with $$0 \leq R < \binom{n}{k},$$

of the corresponding k-combination $\{r_1, r_2, \ldots, r_k\}$, with $0 \leq r_1 < r_2 < \ldots < r_k < n$, in the combinatorial number system of degree k for example as follows:

$$R = \sum_{j=1}^{k} \binom{r_j}{j}$$

For example, in the case shown in Table 1, where n=40, k=5 and the determined resource indices are $\{r_1, r_2, r_3, r_4, r_5\} = \{6, 19, 22, 30, 37\}$, the rank of the 5-combination $\{r_1, r_2, r_3, r_4, r_5\}$ is:

$$R = \binom{6}{1} + \binom{19}{2} + \binom{22}{3} + \binom{30}{4} + \binom{37}{5} = 465019$$

Figure 5:
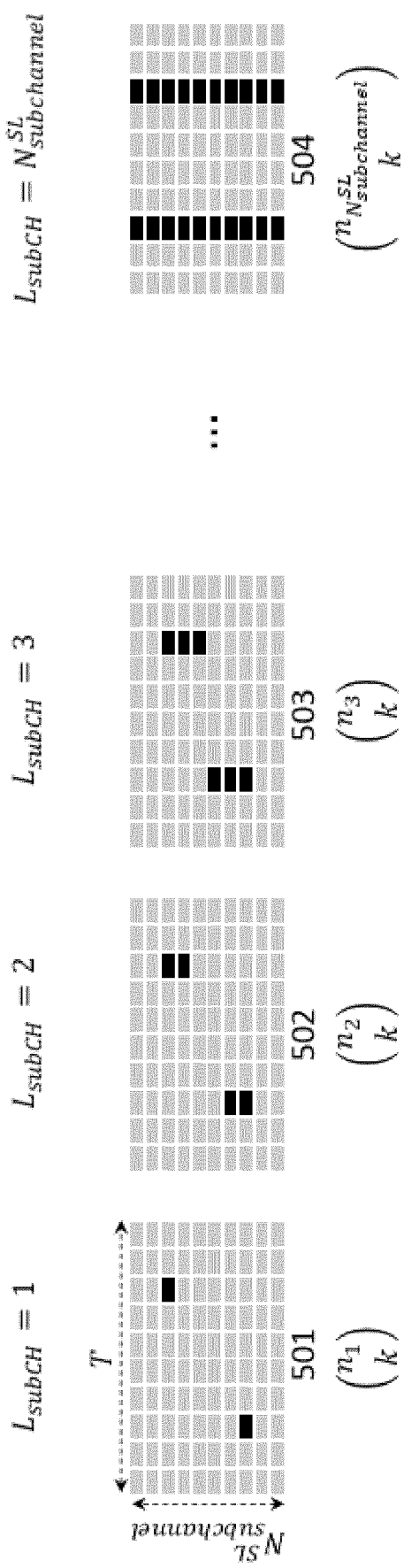
FIG. 5 illustrates examples of encoding a determined resource size.

It should be noted that the rank R determined according to the above formula does not convey information about the resource size $L_{subCH}$ determined by the first UE. FIG. 5 shows examples illustrating how the resource size $L_{subCH}$ may impact the number of candidate radio resources, and as a result, the number of possible ways of selecting k radio resources out of them. Let $n_i = T \times (N_{subchannel}^{SL} - i + 1)$ denote the total number of candidate single-slot resources consisting of i contiguous subchannels within the RSW and the configured sidelink radio resource pool. The number of possible ways of selecting k radio resources out of $n_i$ candidate radio resources is $$\binom{n_i}{k}.$$

It should be noted that if $n_i < k$, then $$\binom{n_i}{k} = 0.$$

In the first example 501, with resource size $L_{subCH} = 1$, the number of possible ways of selecting k radio resources out of $n_1$ candidate radio resources is $$\binom{n_1}{k}.$$

In the second example 502, with resource size $L_{subCH} = 2$, the number of possible ways of selecting k radio resources out of $n_2$ candidate radio resources is $$\binom{n_2}{k}.$$

In the third example 502, with resource size $L_{subCH} = 3$, the number of possible ways of selecting k radio resources out of $n_3$ candidate radio resources is $$\binom{n_3}{k}.$$

In the fourth example 504, with resource size $L_{subCH} = N_{subchannel}^{SL}$, the number of possible ways of selecting k radio resources out of $n_{N_{subchannel}^{SL}}$ candidate radio resources is $$\binom{n_{N_{subchannel}^{SL}}}{k}.$$

Accordingly, the first UE may encode the subset of selected radio resources as a CRIV, with $$0 \leq CRIV < \sum_{i=1}^{N_{subchannel}^{SL}} \binom{n_i}{k}.$$

The CRIV may be determined 404 for example as follows:

$$CRIV = R + \sum_{i=1}^{L_{subCH}-1} \binom{n_i}{k}$$

This way, the first UE may jointly indicate with a single integer value, i.e., the CRIV, the determined set of radio resource indices $\{r_1, r_2, \ldots, r_k\}$ (encoded by the rank R) and the resource size $L_{subCH}$ (encoded by the sum term). As there may be $$\sum_{i=1}^{N_{subchannel}^{SL}} \binom{n_i}{k}$$

possible values for CRIV, the overhead incurred for signaling the CRIV may amount to $$\left\lceil \log_2 \left( \sum_{i=1}^{N_{subchannel}^{SL}} \binom{n_i}{k} \right) \right\rceil \text{bits}.$$

The sum term in the CRIV formula above may be seen as an offset corresponding to the total number of possible ways of selecting k radio resources smaller than the determined resource size $L_{subCH}$ within the RSW and the configured sidelink resource pool. An alternative way of jointly indicating with a single CRIV the determined set of resource indices and the resource size $L_{subCH}$ is by using an offset corresponding to the total number of possible ways of selecting k radio resources larger than the determined resource size $L_{subCH}$, i.e.:

$$CRIV' = R + \sum_{i=L_{subCH}+1}^{N_{subchannel}^{SL}} \binom{n_i}{k}$$

The determined CRIV indicating the subset of selected radio resources may be transmitted 405 to the one or more second UEs for example by using physical layer signaling, such as a $1^{st}$ stage SCI or $2^{nd}$ stage SCI, or by using higher layer signaling, such as a medium access control (MAC) control element (CE) or an RRC message. In case of using an RRC message to convey the CRIV, a possible abstract syntax notation one (ASN.1) representation of the message may be, for example:

```
SidelinkResourceSelection-r17 ::=    SEQUENCE {
    sl-ResourceSetIndicationValue-r17    INTEGER (0..N-1),
}
``` where sl-ResourceSetIndicationValue-r17 comprises the CRIV.

In some exemplary embodiments, the resource size $L_{subCH}$ may be pre-defined or configured, such that it may not be necessary to signal it to the one or more second UEs. In this case, the CRIV may be set equal to the determined rank, i.e., CRIV=R. As there may be $$\binom{n}{k}$$

possible values for R, the overhead incurred for signaling CRIV may in this case be reduced to $$\left\lceil \log_2 \binom{n}{k} \right\rceil \text{ bits,}$$

where n denotes the total number of candidate radio resources.

In some exemplary embodiments, when the selected radio resources do not overlap in time, i.e., they occur in different slots, as in Tables 1 and 2 above, the first UE may determine a rank R' based on time-domain information for example as follows:

$$R' = \sum_{j=1}^{k} \binom{t_j}{j}$$

where $0 \leq t_1 < t_2 < \ldots < t_k < T$ are the logical slot offsets (in increasing order) of the selected radio resources with respect to the first logical slot of the RSW. In the example shown in Tables 1 and 2, the logical slot offsets of the selected radio resources are $\{t_1, t_2, \ldots, t_5\} = \{0, 2, 6, 7, 9\}$, and thus:

$$R' = \binom{0}{1} + \binom{2}{2} + \binom{6}{3} + \binom{7}{4} + \binom{9}{5} = 182$$

In this case, the time-domain information may be conveyed to the second UE(s) by a TRIV field equal to the determined rank, i.e., TRIV=R', with an overhead of $$\left\lceil \log_2 \binom{T}{k} \right\rceil \text{ bits.}$$

The frequency-domain information, if applicable, may be conveyed by using a separate FRIV field based on a generalized FRIV formula:

$$FRIV = \sum_{j=1}^{k} n_{subCH,j}^{start} \left( N_{subchannel}^{SL} + 1 - L_{subCH} \right)^{j-1} + \sum_{i=1}^{L_{subCH}-1} \left( N_{subchannel}^{SL} + 1 - i \right)^{k}$$

where $0 \leq n_{subCH,j}^{start} < N_{subchannel}^{SL} - L_{subCH} + 1$ is a starting sub channel index of the jth selected radio resource within the configured sidelink radio resource pool. This may incur an overhead of $$\left\lceil \log_2 \left( \sum_{m=1}^{N_{subchannel}^{SL}} m^k \right) \right\rceil$$

bits.

From the received FRIV value, the second UE(s) may obtain the frequency-domain information for example as follows:

$$L_{subCH} = \max_{l \geq 1} l \ \Big| \ \sum_{i=1}^{l-1} \left( N_{subchannel}^{SL} + 1 - i \right)^{k} \leq FRIV$$

$$n_{subCH,j}^{start} = \left\lfloor \frac{FRIV - \sum_{i=1}^{L_{subCH}-1} \left( N_{subchannel}^{SL} + 1 - i \right)^{k} - \sum_{i=j+1}^{k} n_{subCH,i}^{start} \left( N_{subchannel}^{SL} + 1 - L_{subCH} \right)^{i-1}}{\left( N_{subchannel}^{SL} + 1 - L_{subCH} \right)^{j-1}} \right\rfloor$$

In some exemplary embodiments, in case the first UE determines a different resource size $L_{subCH,j}$ for at least some of the selected radio resources, the first UE may convey the different resource sizes to the one or more second UEs for example by means of a resource length indication value (LIV) as follows:

$$LIV = \sum_{j=1}^{k} (L_{subCH,j} - 1)(N_{subchannel}^{SL})^{j-1}$$

As there may be $(N_{subchannel}^{SL})^k$ possible values for LIV, the overhead incurred for signaling LIV may amount to $\lceil k \log_2(N_{subchannel}^{SL}) \rceil$ bits.

Alternatively, in case separate TRIV and FRIV fields are used to convey the time-domain and frequency-domain information, respectively, the resource sizes $L_{subCH,j}$ may be more efficiently indicated along with the respective starting subchannel indices $n_{subCH,j}^{start}$, by a generalized FRIV formula for example as follows:

$$FRIV = \sum_{j=1}^{k} n_{subCH,j}^{start} \pi_{i=1}^{j-1} (N_{subchannel}^{SL} + 1 - L_{subCH,i}) + f_k(L_{subCH,1}, \ldots, L_{subCH,k})$$

where the last term $f_k(L_{subCH,1}, \ldots, L_{subCH,k})$ may be obtained recursively for example as follows:

$$f_k = \left( N_{subchannel}^{SL} + 1 - L_{subCH,k} \right) f_{k-1} + a^{k-1} \sum_{i=1}^{L_{subCH,k}-1} \left( N_{subchannel}^{SL} + 1 - i \right)$$

with $f_0 = 0$ and $a = \frac{N_{subchannel}^{SL}(N_{subchannel}^{SL} + 1)}{2}$.

From the received FRIV value, the second UE(s) may obtain the frequency-domain information for example as follows:

$$L_{subCH,j} = \max_{l \geq 1} l \ \Big| \ f_k(1, 1, \ldots, 1, l, L_{subCH,j+1}, \ldots, L_{subCH,k}) \leq FRIV$$

$$n_{subCH,j}^{start} = \left\lfloor \frac{FRIV - f_k(L_{subCH,1}, \ldots, L_{subCH,k}) - \sum_{i=j+1}^{k} n_{subCH,i}^{start} \prod_{m=1}^{i-1} \left( N_{subchannel}^{SL} + 1 - L_{subCH,m} \right)}{\prod_{i=1}^{j-1} \left( N_{subchannel}^{SL} + 1 - L_{subCH,i} \right)} \right\rfloor$$

Figure 6:
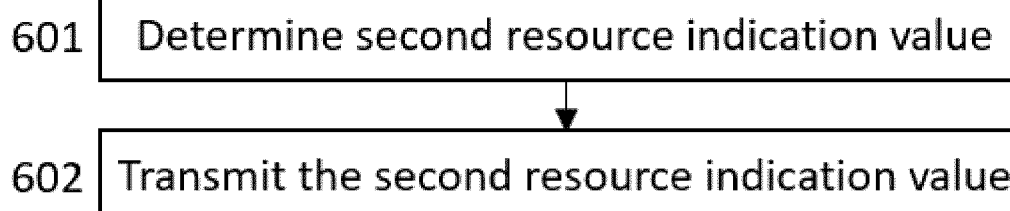
FIGS. 6-8 illustrate flow charts according to some exemplary embodiments.

FIG. 6 illustrates a flowchart according to an exemplary embodiment, wherein the first UE determines 601 a second resource indication value indicating at least a plurality of resource sizes associated with the subset of radio resources. The second resource indication value may be, for example, an LIV or an FRIV according to the generalized FRIV formula presented above. The first UE transmits 602 the second resource indication value to the one or more second UEs.

Figure 7:
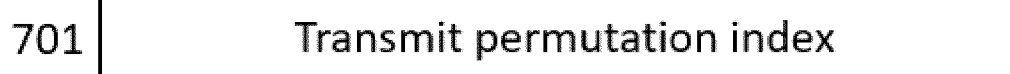

FIG. 7 illustrates a flowchart according to another exemplary embodiment, wherein the first UE transmits 701, to the one or more second UEs, a permutation index indicating a permutation of the subset of radio resources. In other words, the first UE may indicate to the one or more second UEs a permutation, i.e., ordering, of the subset of selected radio resources. The permutation may be indicated by a permutation index P such that 0≤P<k!. As there may be k! permutations of the subset of selected radio resources, this may incur an overhead of $\lceil \log_2(k!) \rceil$ bits. A permutation may correspond, for example, to an order of preference of a given selected radio resource from the perspective of the first UE. In this case, the second UE may consider the selected radio resources in sequence according to the indicated permutation, for example when choosing a radio resource for a PSSCH transmission by the second UE. Alternatively, a permutation may be used to indicate which of the selected radio resources should be taken by which of the second UEs in a group of second UEs. For example, a first group member, for example a UE with the lowest or highest identifier in the group, may take the first selected radio resource according to the indicated permutation. A second group member, for example a UE with a second-lowest or second-highest identifier in the group, may take the second selected radio resource according to the indicated permutation, and so forth. If no permutation is indicated by the first UE, then for example the group member with the jth-lowest or jth-highest identifier in the group may take the jth selected radio resource corresponding to resource index $r_j$.

Figure 8:
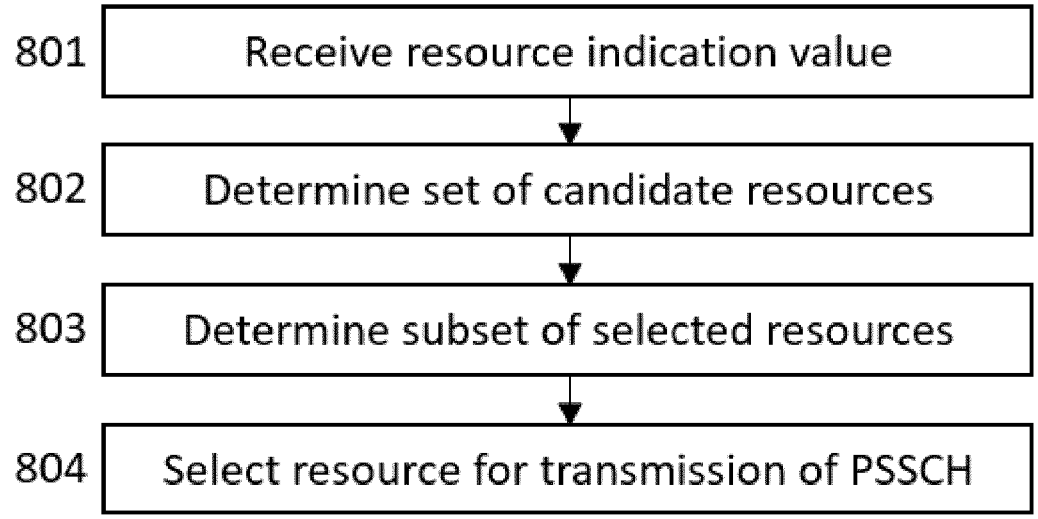

FIG. 8 illustrates a flowchart according to an exemplary embodiment from the perspective of the second UE. Referring to FIG. 8, a second UE receives 801 from a first UE a resource indication value, for example CRIV, indicating at least a set of resource indices associated with a subset of radio resources. A resource index in the set of resource indices indicates a location of a radio resource comprised in the subset of radio resources in the time domain and the frequency domain. The second UE determines 802 a set of candidate radio resources for transmission of PSSCH. The second UE determines 803 the subset of selected radio resources from the set of candidate radio resources based on the received CRIV. The second UE selects 804 one or more radio resources from the determined subset of selected radio resources for a PSSCH transmission.

The second UE may receive 801 the CRIV from the first UE by using physical layer signaling, for example within an SCI, or by using higher layer signaling, for example within a MAC CE or an RRC message.

The set of candidate radio resources determined 802 by the second UE may be substantially identical to the set of candidate radio resources determined by the first UE. The second UE may determine a RSW substantially identical to the RSW determined by the first UE based on a time, for example a slot, in which the CRIV is received from the first UE, for example based on a slot in which an SCI comprising the CRIV is received. For example, the RSW may start a pre-defined number of slots thereafter, in order to give the second UE sufficient time to prepare the data to be transmitted. If not pre-defined, such a slot offset may be indicated by the first UE to the second UE for example along with the CRIV. The second UE may also determine the RSW based on a time, for example a slot, in which the second UE transmitted a CR, SR or BSR to the first UE, and/or a packet delay budget of the data to be transmitted by the second UE. Alternatively, the RSW may be pre-defined or configured.

The second UE may determine a resource size $L_{subCH}$ based on the received CRIV for example as follows:

$$L_{subCH} = \max l \left| \sum_{i=1}^{l-1} \binom{n_i}{k} \leq CRIV \right.$$

where $n_i = T \times (N_{subchannel}^{SL} - i + 1)$.

As another example, the resource size $L_{subCH}$ may be determined as follows:

$$L_{subCH} = \min l \left| \sum_{i=l+1}^{N_{subchannel}^{SL}} \binom{n_i}{k} \leq CRIV' \right.$$

Alternatively, the resource size $L_{subCH}$ may be pre-defined or configured.

Based on the determined or pre-defined RSW, and the determined or pre-defined resource size $L_{subCH}$, the second UE may determine a set of candidate radio resources within a configured sidelink radio resource pool for PSSCH transmission by the second UE. As mentioned previously, the set of candidate radio resources determined by the second UE may be substantially identical to the set of candidate radio resources determined by the first UE.

For determining 803 the subset of selected radio resources based on the received CRIV, the second UE may recover the rank R of the k-combination $\{r_1, r_2, \ldots, r_k\}$ based on the determined resource size $L_{subCH}$ for example as follows:

$$R = CRIV - \sum_{i=1}^{L_{subCH}-1} \binom{n_i}{k}$$

As another example, the rank R may be determined as follows:

$$R = CRIV' - \sum_{i=L_{subCH}+1}^{N_{subchannel}^{SL}} \binom{n_i}{k}$$

The second UE may then determine the resource indices $\{r_1, r_2, \ldots, r_k\}$ from the recovered rank R for example based on a greedy algorithm as follows:

$$r_k = \max r \left| \binom{r}{k} \leq R, \right.$$

$$r_{k-1} = \max r \left| \binom{r}{k-1} \leq R - \binom{r_k}{k}, \right.$$

$$r_{k-2} = \max r \left| \binom{r}{k-2} \leq R - \binom{r_k}{k} - \binom{r_{k-1}}{k-1}, \right.$$

and so forth. For example, considering the case of Table 1 above, the resource indices may be determined as follows:

$$r_5 = \max r \mid \binom{r}{5} \leq R \ r_5 = 37$$

$$r_4 = \max r \mid \binom{r}{4} \leq R - \binom{r_5}{5} \ r_4 = 30$$

$$r_3 = \max r \mid \binom{r}{3} \leq R - \binom{r_5}{5} - \binom{r_4}{4} \ r_3 = 22$$

$$r_2 = \max r \mid \binom{r}{2} \leq R - \binom{r_5}{5} - \binom{r_4}{4} - \binom{r_3}{3} \ r_2 = 19$$

$$r_1 = \max r \mid \binom{r}{1} \leq R - \binom{r_5}{5} - \binom{r_4}{4} - \binom{r_3}{3} - \binom{r_2}{2} \ r_1 = 6$$

Based on the determined resource index $r_j$ for a given radio resource j in the k selected radio resources ($1 \leq j \leq k$), the second UE may determine the logical slot offset $t_j$ as well as the starting subchannel index $n_{subCH,j}^{start}$ of the jth selected radio resource within the RSW and the configured sidelink radio resource pool. In case the candidate radio resources are assumed to be enumerated by considering the time domain first, these indices may be given for example by:

$$t_j = r_j \bmod T$$

$$n_{subCH,j}^{start} = \left\lfloor \frac{r_j}{T} \right\rfloor$$

Alternatively, in case the candidate radio resources are assumed to be enumerated by considering the frequency domain first, these indices may be given for example by:

$$t_j = \left\lfloor \frac{r_j}{N_{subchannel}^{SL} - L_{subCH} + 1} \right\rfloor$$

$$n_{subCH,j}^{start} = r_j \bmod (N_{subchannel}^{SL} - L_{subCH} + 1)$$

The second UE may select 804 one or more radio resources for transmission of PSSCH from the determined subset of selected radio resources indicated by the first UE. For example, the second UE may select the one or more radio resources for transmission of PSSCH from the determined subset of selected radio resources indicated by the first UE based on sensing measurements, such as RSRP and/or RSSI, performed by the second UE.

Figure 9:
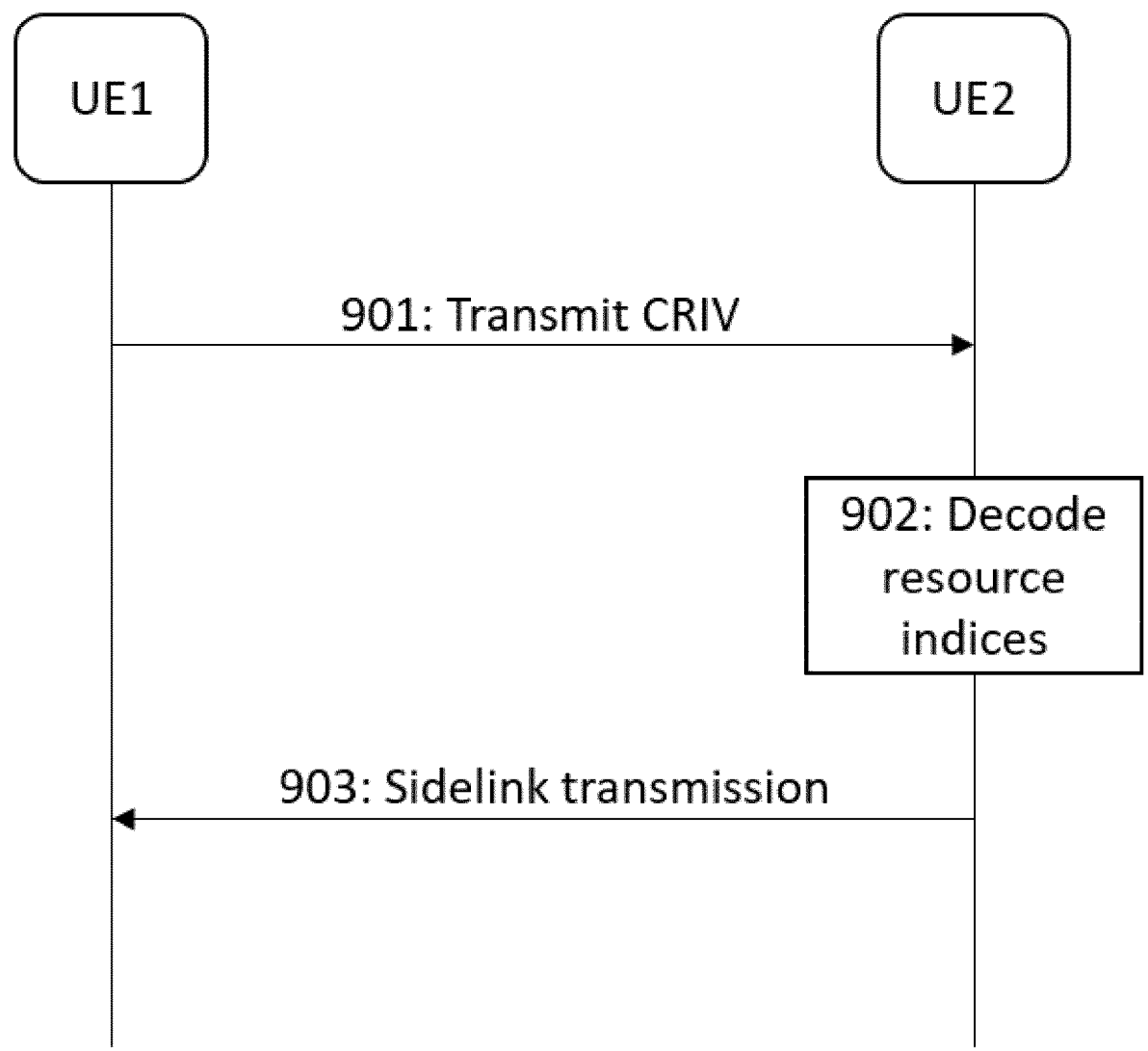
FIG. 9 illustrates a signaling diagram according to an exemplary embodiment.

FIG. 9 illustrates a signaling diagram according to an exemplary embodiment. Referring to FIG. 9, a first UE (denoted as UE1) transmits 901 a message comprising a resource indication value, for example CRIV, to a second UE (denoted as UE2). The second UE decodes 902 the resource indices and selects a radio resource for a PSSCH transmission based on the received CRIV. The second UE transmits 903 the PSSCH transmission to the first UE by using at least the selected radio resource.

Alternatively, the second UE may transmit the PSSCH transmission to a third UE (instead of the first UE) by using at least the selected radio resource.

The functions and/or blocks described above by means of FIGS. 4 and 6-9 are in no absolute chronological order, and some of them may be performed simultaneously or in an order differing from the described one. Other functions and/or blocks may also be executed between them or within them.

A technical advantage provided by some exemplary embodiments is that they may provide an efficient way for signaling an arbitrary set of radio resources within a resource selection window and configured sidelink radio resource pool for inter-UE coordination for example in NR sidelink mode 2 resource allocation. Herein, efficiency may refer to a reduced bit overhead. In comparison to the legacy TRIV & FRIV technique used in SCI format 1-A, which is limited to a maximum of k=2 selected radio resources, the CRIV approach provided by some exemplary embodiments may be used to signal any number of selected radio resources. As the CRIV encodes jointly the time-domain and frequency-domain locations of the selected radio resources, and a given CRIV value corresponds to a unique and valid choice of these variables, the CRIV approach incurs minimal bit overhead. In addition, some exemplary embodiments may enable the selected radio resources to overlap in time.

In some exemplary embodiments, signaling the CRIV may use $$\Phi_{CRIV} = \left\lceil \log_2 \left( \sum_{i=1}^{N_{subchannel}^{SL}} \binom{n_i}{k} \right) \right\rceil \text{ bits,}$$

where $n_i = T \times (N_{subchannel}^{SL} - i + 1)$. On the other hand, signaling the TRIV & FRIV may use $$\Phi_{TRIV+FRIV} =$$

$$\Phi_{TRIV} + \Phi_{FRIV} = \left\lceil \log_2 \binom{T+k-1}{k} \right\rceil + \left\lceil \log_2 \left( \sum_{m=1}^{N_{subchannel}^{SL}} m^k \right) \right\rceil \text{ bits.}$$

Table 3 below depicts the overhead values for the CRIV approach and the TRIV & FRIV approach assuming T=10 slots and $N_{subchannel}^{SL}$=10 subchannels.

TABLE 3

| k | 1 | 2 | 3 | 4 | 5 | 6 | 7 | 8 | 9 | 10 |
|---|---|---|---|---|---|---|---|---|---|----|
| $\Phi_{CRIV}$ | 10 | 15 | 19 | 24 | 28 | 32 | 35 | 39 | 42 | 45 |
| $\Phi_{TRIV+FRIV}$ | 10 | 15 | 20 | 25 | 29 | 34 | 39 | 43 | 47 | 51 |

In order to provide a fair comparison, the overhead incurred by the TRIV generalized for k radio resources, $$\Phi_{TRIV} = \left\lceil \log_2 \binom{T+k-1}{k} \right\rceil,$$

should account for the number of ways to choose k slots from a set of T slots allowing for duplicates, i.e., the number of k-combinations with repetition. This corresponds to the situation where the k selected radio resources may overlap in time.

Figure 10:
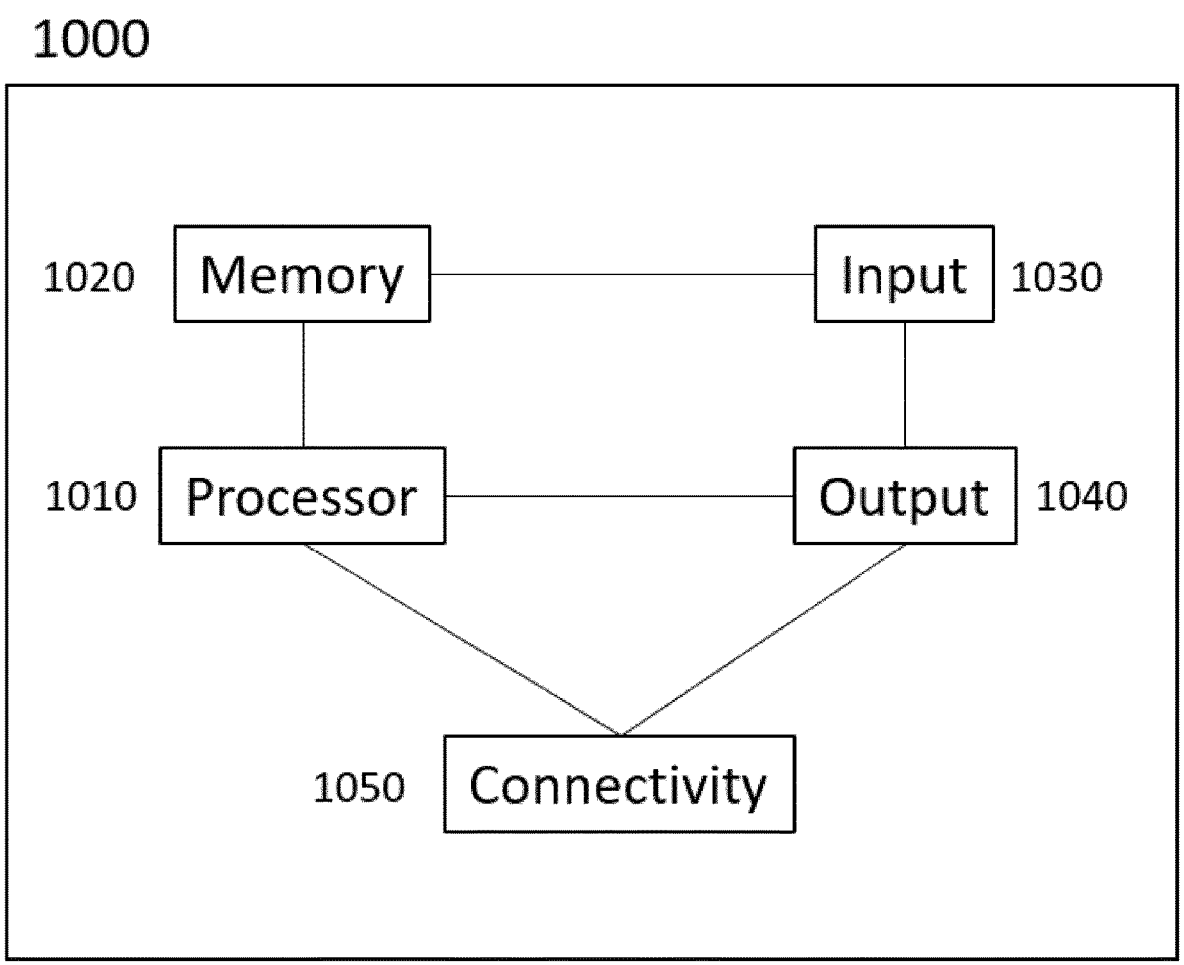
FIG. 10 illustrates an apparatus according to an exemplary embodiment.

FIG. 10 illustrates an apparatus 1000, which may be an apparatus such as, or comprised in, a terminal device, according to an exemplary embodiment. A terminal device may also be referred to as a UE herein. The apparatus 1000 comprises a processor 1010. The processor 1010 interprets computer program instructions and processes data. The processor 1010 may comprise one or more programmable processors. The processor 1010 may comprise programmable hardware with embedded firmware and may, alternatively or additionally, comprise one or more application specific integrated circuits, ASICs.

The processor 1010 is coupled to a memory 1020. The processor is configured to read and write data to and from the memory 1020. The memory 1020 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1020 stores computer readable instructions that are executed by the processor 1010. For example, non-volatile memory stores the computer readable instructions and the processor 1010 executes the instructions using volatile memory for temporary storage of data and/or instructions.

The computer readable instructions may have been pre-stored to the memory 1020 or, alternatively or additionally, they may be received, by the apparatus, via an electromagnetic carrier signal and/or may be copied from a physical entity such as a computer program product. Execution of the computer readable instructions causes the apparatus 1000 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1000 may further comprise, or be connected to, an input unit 1030. The input unit 1030 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1030 may comprise an interface to which external devices may connect to.

The apparatus 1000 may also comprise an output unit 1040. The output unit may comprise or be connected to one or more displays capable of rendering visual content, such as a light emitting diode (LED) display, a liquid crystal display (LCD) and/or a liquid crystal on silicon (LCoS) display. The output unit 1040 may further comprise one or more audio outputs. The one or more audio outputs may be for example loudspeakers.

The apparatus 1000 further comprises a connectivity unit 1050. The connectivity unit 1050 enables wireless connectivity to one or more external devices. The connectivity unit 1050 comprises at least one transmitter and at least one receiver that may be integrated to the apparatus 1000 or that the apparatus 1000 may be connected to. The at least one transmitter comprises at least one transmission antenna, and the at least one receiver comprises at least one receiving antenna. The connectivity unit 1050 may comprise an integrated circuit or a set of integrated circuits that provide the wireless communication capability for the apparatus 1000. Alternatively, the wireless connectivity may be a hardwired application specific integrated circuit (ASIC). The connectivity unit 1050 may comprise one or more components such as a power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 1000 may further comprise various components not illustrated in FIG. 10. The various components may be hardware components and/or software components.

As used in this application, the term "circuitry" may refer to one or more or all of the following:
a. hardware-only circuit implementations (such as implementations in only analog and/or digital circuitry) and
b. combinations of hardware circuits and software, such as (as applicable):
   i. a combination of analog and/or digital hardware circuit(s) with software/firmware and
   ii. any portions of hardware processor(s) with software (including digital signal processor(s)), software, and memory(ies) that work together to cause an apparatus, such as a mobile phone, to perform various functions) and
c. hardware circuit(s) and or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor, and at least one memory including computer program code, wherein the at least one memory and the computer program code are configured, with the at least one processor, to cause the apparatus to:
   select a subset of radio resources from a set of candidate radio resources;
   determine a set of resource indices for the subset of radio resources based at least partly on a pre-defined enumeration order of the set of candidate radio resources in time and frequency;
   determine a first resource indication value indicating at least the set of resource indices;
   transmit the first resource indication value to one or more second terminal devices;
   wherein the apparatus is comprised in a first terminal device, the apparatus being further caused to
   determine a second resource indication value indicating a plurality of resource sizes associated with the subset of radio resources; and
   transmit the second resource indication value to one or more second terminal devices.

2. An apparatus according to claim 1, wherein the first resource indication value is determined by using a combinatorial number system.

3. An apparatus according to claim 1, wherein the first resource indication value further indicates a resource size associated with the subset of radio resources.

4. An apparatus according to claim 1, wherein the apparatus is further caused to transmit, to the one or more second terminal devices, a permutation index indicating a permutation of the subset of radio resources.

5. An apparatus according to claim 1, wherein the set of resource indices are determined by starting with the time.

6. An apparatus according to claim 1, wherein the set of resource indices are determined by starting with the frequency.

7. An apparatus comprising at least one processor, and at least one memory including computer program code, wherein the at least one memory and the computer program code are configured, with the at least one processor, to cause the apparatus to:
   receive a resource indication value from a first terminal device, wherein the resource indication value indicates at least a set of resource indices associated with a subset of radio resources, and wherein a resource index in the set of resource indices indicates a location of a radio resource comprised in the subset of radio resources in time and frequency;
   determine the subset of radio resources from a set of candidate radio resources based at least partly on the resource indication value;
   receive a second resource indication value indicating a plurality of resource sizes associated with the subset of radio resources;
   based on the second resource indication value, select a radio resource from the subset of radio resources for a sidelink transmission; wherein the apparatus is comprised in a second terminal device.

8. An apparatus according to claim 7, wherein the resource indication value further indicates a resource size associated with the subset of radio resources; and wherein the subset of radio resources is determined based at least partly by determining the resource size based on the received resource indication value.

9. An apparatus according to claim 7, wherein the subset of radio resources is determined based at least partly by determining a set of logical slot offsets and a set of starting subchannel indices associated with the subset of radio resources based at least partly on the set of resource indices.

10. An apparatus according to claim 7, wherein the apparatus is further caused to transmit the sidelink transmission by using at least the selected radio resource.

11. A method comprising:
    selecting, by a first terminal device, a subset of radio resources from a set of candidate radio resources;
    determining, by the first terminal device, a set of resource indices for the subset of radio resources based at least partly on a pre-defined enumeration order of the set of candidate radio resources in time and frequency;
    determining, by the first terminal device, a first resource indication value indicating at least the set of resource indices;
    transmitting, by the first terminal device, the first resource indication value to one or more second terminal devices, wherein the first terminal device is further caused to:
    determine a second resource indication value indicating a plurality of resource sizes associated with the subset of radio resources; and
    transmit the second resource indication value to one or more second terminal devices.

12. A method comprising:
    receiving, by a second terminal device, a resource indication value from a first terminal device, wherein the resource indication value indicates at least a set of resource indices associated with a subset of resources;
    determining, by the second terminal device, the subset of resources from a set of candidate resources based at least partly on the resource indication value;
    receive a second resource indication value indicating a plurality of resource sizes associated with the subset of radio resources; and
    based on at least the second resource indication value, selecting, by the second terminal device, a resource from the subset of resources for a sidelink transmission.

* * * * *